United States Patent
Casey et al.

(10) Patent No.: US 7,522,634 B2
(45) Date of Patent: *Apr. 21, 2009

(54) USER-TO-USER DATA RELAY SYSTEMS AND METHODS

(75) Inventors: Steven M. Casey, Littleton, CO (US); Shawn M. Casey, Littleton, CO (US)

(73) Assignee: Qwest Communications International Inc., Denver, CO (US)

(*) Notice: Subject to any disclaimer, the term of this patent is extended or adjusted under 35 U.S.C. 154(b) by 974 days.

This patent is subject to a terminal disclaimer.

(21) Appl. No.: 10/976,015

(22) Filed: Oct. 27, 2004

(65) Prior Publication Data

US 2006/0088004 A1  Apr. 27, 2006

(51) Int. Cl.
*H04J 3/16* (2006.01)
*H04Q 7/20* (2006.01)

(52) U.S. Cl. .................. 370/468; 455/452.1; 455/456.1

(58) Field of Classification Search ................ 370/468; 455/452.1, 456.1
See application file for complete search history.

(56) References Cited

U.S. PATENT DOCUMENTS

| | | | |
|---|---|---|---|
| 5,572,221 A | 11/1996 | Marlevi et al. | |
| 5,802,460 A | 9/1998 | Parvulescu et al. | |
| 6,125,278 A | 9/2000 | Wieczorek et al. | |
| 6,711,408 B1* | 3/2004 | Raith | 455/440 |
| 7,190,700 B2* | 3/2007 | Choi | 370/468 |
| 2002/0093929 A1* | 7/2002 | Mangold et al. | 370/336 |
| 2002/0107025 A1* | 8/2002 | Oliveira | 455/452 |
| 2003/0117316 A1 | 6/2003 | Tischer | |
| 2003/0140115 A1* | 7/2003 | Mehra | 709/217 |
| 2003/0156558 A1* | 8/2003 | Cromer et al. | 370/331 |
| 2003/0233453 A1* | 12/2003 | Lee | 709/225 |
| 2004/0162084 A1* | 8/2004 | Wang | 455/456.1 |
| 2004/0192342 A1 | 9/2004 | Ranganathan | |
| 2004/0219932 A1* | 11/2004 | Verteuil | 455/456.2 |
| 2004/0224665 A1 | 11/2004 | Kokubo | |
| 2004/0259546 A1* | 12/2004 | Balachandran et al. | 455/435.2 |
| 2005/0122977 A1 | 6/2005 | Lieberman | |
| 2005/0153697 A1* | 7/2005 | Patel | 455/442 |
| 2007/0097862 A1* | 5/2007 | Moon et al. | 370/230 |

OTHER PUBLICATIONS

U.S. Appl. No. 10/976,022, Non-Final Office Action mailed Jul. 6, 2006, 13 pages.
U.S. Appl. No. 10/976,022, Non-Final Office Action mailed Nov. 30, 2006, 13 pages.

(Continued)

Primary Examiner—Andrew Lee
(74) Attorney, Agent, or Firm—Townsend and Townsend and Crew, LLP

(57) ABSTRACT

The present invention provides systems and methods for providing mobile users with requested resources. In one such method, first and second location indicators are received for a mobile user, with each of the location indicators having a time associated therewith. The method includes calculating a mobile vector of the mobile user and associating the mobile vector with a first network region. The method further includes identifying a second mobile user in the first network region having at least a portion of the requested resource, and sending a sub-resource request to the second mobile user. The sub-resource request causes the second mobile user to send at least a portion of the requested resource to the mobile user.

33 Claims, 8 Drawing Sheets

OTHER PUBLICATIONS

U.S. Appl. No. 10/976,022, Final Office Action mailed Mar. 29, 2007, 14 pages.
U.S. Appl. No. 10/976,022, Advisory Action mailed Jun. 11, 2007, 3 pages.
U.S. Appl. No. 10/976,022, Non-Final Office Action mailed Sep. 12, 2007, 15 pages.
U.S. Appl. No. 10/976,022, Final Office Action mailed Feb. 14, 2008, 17 pages.
U.S. Appl. No. 10/976,022, Advisory Action mailed May 15, 2008, 3 pages.
U.S. Appl. No. 10/976,022, Non-Final Office Action mailed Oct. 27, 2008, 12 pages.

* cited by examiner

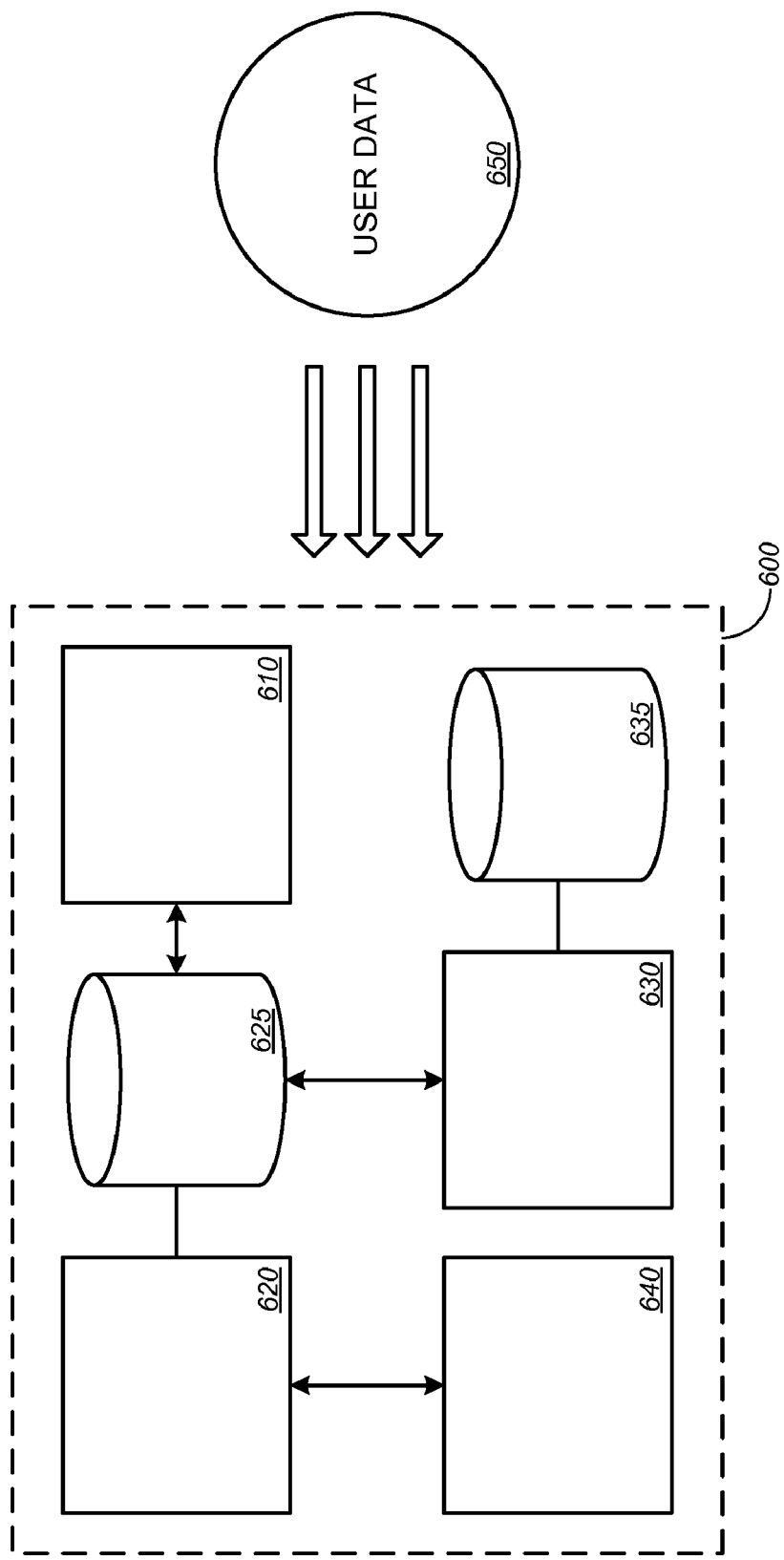

USER-TO-USER DATA RELAY SYSTEMS AND METHODS

CROSS-REFERENCE TO RELATED CASES

The present application is related to U.S. application Ser. No. 10/976,022, entitled "Mobile Caching and Data Relay Vectoring Systems and Methods," filed contemporaneously herewith and assigned to the assignee of the present invention, the complete disclosure of which is incorporated herein by reference.

BACKGROUND OF THE INVENTION

The present invention relates generally to providing users with requested resources, and more specifically, to systems and methods for providing mobile users with requested resources in one or more network regions.

The growth of wireless networks has extended far beyond cellular telephone service. As these networks continue to evolve, the ability to transmit and receive greater amounts of data will be desirable. For example, it may be desirable for users to download a movie from a server located at the Blockbuster® store for later viewing that night. Currently, the user must stop at a physical Blockbuster® location to rent the movie in VHS or DVD format. Further, as networks evolve from large broadcast networks to micro and pico cell systems, data fulfillment approaches may need to be modified or developed anew.

BRIEF SUMMARY OF THE INVENTION

The present invention is generally related to providing users with requested resources, and more specifically, to systems and methods for providing mobile users with requested resources. The present invention will be particularly useful for satisfying resource requests from mobile users when the users migrate between multiple cells or regions in a network. The present invention accomplishes some of the methods of the present invention by calculating a mobile vector for the mobile user and associating the mobile vector with one or more network regions to facilitate delivery of the requested resources. In some embodiments, the mobile users are provided with the requested resources by other mobile users.

In one embodiment, a method of responding to a resource request of a mobile user includes receiving first and second location indicators for the mobile user, each of the first and second location indicators having a time associated therewith. The method includes calculating a mobile vector of the mobile user and associating the mobile vector with a first network region. The method further includes identifying a second mobile user in the first network region having at least a portion of the requested resource, and sending a sub-resource request to the second mobile user. The sub-resource request causes the second mobile user to send at least a portion of the requested resource to the first mobile user.

The requested resource can be most any data package or content, including without limitation a movie, a game, an email message, a file, a music selection, other data packages and the like. The request may also be for a real time delivery of the data package. In one aspect, the first and second location indicators each comprises a latitude, a longitude and a time stamp, and alternatively may also include an altitude and/or a direction.

In some aspects, the mobile user and second mobile user are stationary when the second mobile user sends the portion of the requested resource to the first mobile user. In other aspects, the second mobile user is not stationary. The sub-resource request also may cause the second mobile user to send the entire requested resource to the first mobile user. The sending of the portion of the requested resource from the second mobile user to the first mobile user occurs transparently to the first mobile user in one aspect.

In some aspects, a third mobile user is identified in a second network region having at least a second portion of the requested resource. The method then includes sending a sub-resource request to the third mobile user causing the third mobile user to send at least the second portion of the requested resource to the first mobile user. The sending of the second portion of the requested resource to the first mobile user may occur when the first mobile user is in the second network region.

The present invention further provides mobile devices that connect to a remote server through a wireless network. In one embodiment, the mobile device includes a processor coupled to a memory and to a Wi-Fi connection, and a location determination device. The memory includes code for sending a resource request to the wireless network via the Wi-Fi connection, code for providing the network a mobile device location using the location determination device, code for receiving a first portion of the requested resource when the mobile device is in a first network region and for receiving a second portion of the requested resource when the mobile device is in a second network region, and code for providing the network with a list of available resources stored in the memory.

In some aspects, the memory further includes code for responding to a second resource request for at least one of the available resources, and/or for sending at least a portion of the available resource to a second mobile device. In one aspect, the memory further includes code for sending a content report to the wireless network. The content report may include a mobile user identifier, a mobile user location, and the list of available resources.

The present invention further includes computer systems for facilitating data transfer between mobile users. In one embodiment, the system includes a processor coupled to a database and a computer readable medium coupled to the processor. The computer readable medium includes code for receiving first and second location indicators for the mobile user, code for calculating a mobile vector of the mobile user and associating the mobile vector with a first network region, and code for identifying a second mobile user in the first network region having at least a portion of the requested resource. The medium also includes code for sending a sub-resource request to the second mobile user to cause the second mobile user to send at least a portion of the requested resource to the first mobile user.

In some aspects, the system further includes code for sending a content request to a plurality of mobile users including the second mobile user. In another aspect, code is provided for receiving a content response from the second mobile user. The content response indicates that the second mobile user has the requested resource, and the content response may be stored in the database. Content responses also may be received from a plurality of mobile users, and stored in the database.

In one aspect, the system includes code for calculating a mobile vector of the second mobile user. Code also may be included for calculating a transfer scheme for transferring the requested resource from the second mobile user to the first mobile user through at least the first network region.

The present invention further provides methods of transferring data between mobile users. One such method includes sending a request into a network region requesting resource reports from a plurality of mobile users, and receiving resource reports from at least some of the mobile users. The method includes receiving a request for a resource from a first mobile user, identifying a second mobile user having the requested resource, and sending a transmission request to the second mobile user. The transmission request requests that the second mobile user send the requested resource to the first mobile user.

In one aspect, a vector controller operates to send the request for resource reports into the network, and/or receives the resource reports. In another aspect, updated resource reports are received from at least some of the plurality of mobile users. In some aspects, the resource reports may be updated, for the first and/or second mobile user, when the requested resource is sent from the second to the first mobile user. The resource report may include a mobile user identifier, a mobile user location, a list of available resources, and/or at least one shareable resource. The resource reports may be stored in a database.

In some aspects, the second user is identified to be in a same network region as the first mobile user. In another aspect, the second user is identified by identifying a location of the first and second mobile users, and comparing a transmission capability of the second mobile user with a receive capability of the first mobile user.

In one aspect, a transmission request is sent to a third mobile user requesting that the third mobile user send at least a portion of the requested resource to the first mobile user. The second and third mobile users may be in two different network regions when the portions of the requested resource are sent to the first mobile user.

The summary provides only a general outline of the embodiments according to the present invention. Many other objects, features and advantages of the present invention will become more fully apparent from the following detailed description, the appended claims and the accompanying drawings.

BRIEF DESCRIPTION OF THE DRAWINGS

FIG. 6 is a simplified schematic of a vector controller for use with some embodiments of the present invention;

DETAILED DESCRIPTION OF THE INVENTION

Figure 1:
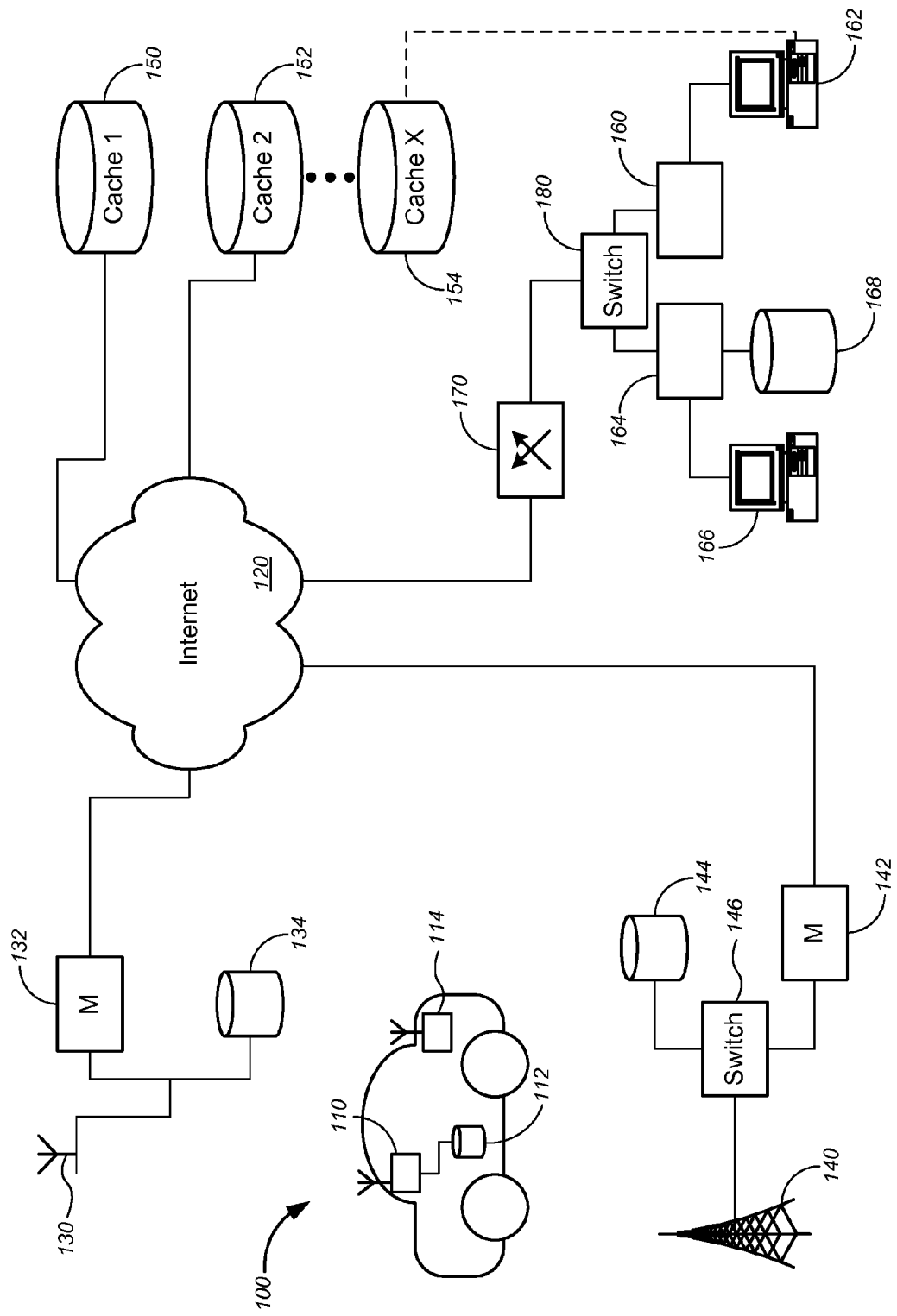
FIG. 1 is a simplified schematic of a system according to the present invention.

With reference to FIG. 1, an embodiment of a system and method for delivering requested resources will be described. As shown in FIG. 1, a mobile user 100 is positioned to interact with the Internet 120 or a variety of networks, including wireless networks, according to methods of the present invention. Mobile user 100 includes a Wi-Fi connection 110 coupled to a cache 112. Cache 112 may be a wide range of memory devices. For example, cache 112 may comprise a server, a computer memory, or the like. Similarly, cache 112 and Wi-Fi connection 110 together may comprise an iPOD, a personal digital assistant (PDA), a laptop computer with a wireless access point, or other device with a wireless or wire line network connection. Further, mobile user 100 has a location determination device 114. In one embodiment, location determination device 114 is a global positioning system (GPS) device, which may include a GPS receiver and associated software, memory, and a processor. In one embodiment, mobile user 100 has a mobile device that includes components 110-114. Alternatively, one or more of connection 110, cache 112, and location determination device 114 are separate devices.

In one embodiment, mobile user 100 wants to receive a resource while mobile user 100 is either stationary or traveling in their vehicle. This requested resource may include most any data package, including without limitation a movie, a game, an email message, a file, a music selection, an audio file, a weather or traffic report, a web page, or the like. In one embodiment, mobile user 100 desires a real time delivery of the data package. This request may occur if mobile user 100 wants to see or hear real time traffic reports while traveling through a busy metropolitan area. The requested resource may reside on any number of systems, represented herein by a series of caches. More specifically, a first cache 150, a second cache 152, up to an $X^{th}$ cache 154 may contain the requested resource. Further, more than one cache together may contain the requested resource. For example, if mobile user 100 requests a web page, the web page content may be stored on cache 150 while advertisements, such as banner advertisements and the like contracted to be displayed with the web page, may be stored on cache 152. In this example, the requested resource is provided by caches 150 and 152.

The requested resource may be delivered to mobile user 100 in a variety of ways within the scope of the present invention. For example, in one embodiment an omni-directional Wi-Fi device 130 transmits the requested resource in all directions extending a prescribed radius from device 130. The prescribed radius may be, for example, one hundred (100) meters in a particular embodiment. In one embodiment, Wi-Fi device 130 receives the requested resource from cache 150 by way of the Internet 120 and, if necessary, a modem 132. The requested resource further may be stored in a cache 134 associated with Wi-Fi connection device 130. In this manner, additional requests for the same resource, such as by subsequent mobile users requesting the same traffic report, may be responded to by transmitting the requested resource as stored in cache 134 without needing to download the resource from cache 150. In one embodiment, the location of Wi-Fi device 130 is known, and may comprise a latitude, a longitude and/or an altitude.

Alternatively, a directional Wi-Fi connection device 140 is used. Generally, such connection devices have greater range, albeit in a particular direction as opposed to all directions. In one embodiment, directional Wi-Fi connection device has a range of about one (1) to five (5) miles, and in a particular embodiment, about three (3) miles. Again, the requested resource may be received at connection device 140 by way of the Internet 120 through a modem 142. Further, the requested resource may be stored in a cache 144 before, during, or after transmission of the requested resource to mobile user 100. A switch 146, which may be an ethernet switch or the like, couples cache 144 with connection device 140 and modem 142. In one embodiment, the location of Wi-Fi device 140 is known, and may comprise a latitude, a longitude and/or an altitude.

In one embodiment of the present invention, a vector controller 160 operates to determine which transmission or connection device 130, 140 should be used to transmit the requested resource to mobile user 100. In the event mobile user 100 is stationary, mobile user 100 will typically receive the requested resource through the transmission device corresponding to the network cell or region in which mobile user 100 resides. However, if mobile user 100 is indeed mobile, mobile user 100 may pass out of the network region or cell before mobile user 100 can receive the requested resource. Thus, in a particular embodiment of the present invention, vector controller 160 operates to direct the transmission of the requested resource to one or more network cells or regions for delivery to mobile user 100, as further described below in conjunction with subsequent figures.

Vector controller 160 may be coupled to an interface device, that in one embodiment is a computer 162. Computer 162 may include a variety of input/output devices, including a graphical user interface (GUI) in one embodiment. Further, in one embodiment, a vector controller 164 may be coupled to a cache or storage medium 168. In this particular embodiment, cache 168 may contain stored user information that, in some embodiments, will be useful for determining which cells mobile user 100 will be entering, thus anticipating a delivery path of the requested resource. Again, vector controller 164 may be coupled to an input device such as a computer 166. A router 170 and a switch 180, such as an ethernet switch or the like, operate to connect the desired vector controller 160, 164 to transmission devices 130, 140 by way of the Internet 120, or other network. Further, vector controllers 160, 164 will be dynamically linked to caches 150-154. In this manner, controller 160, 164 can determine the size of the requested resource prior to transmission thereof to mobile user 100 as further detailed below. In one embodiment, vector controller 160, 164 is a software based controller, having calculator functionality for calculating transmission data rates to user 100, user speed and location, determining which network regions user will be traveling in, and the like. Additional details on some embodiments of vector controllers 160, 164 are discussed in conjunction with FIG. 6.

Figure 2:
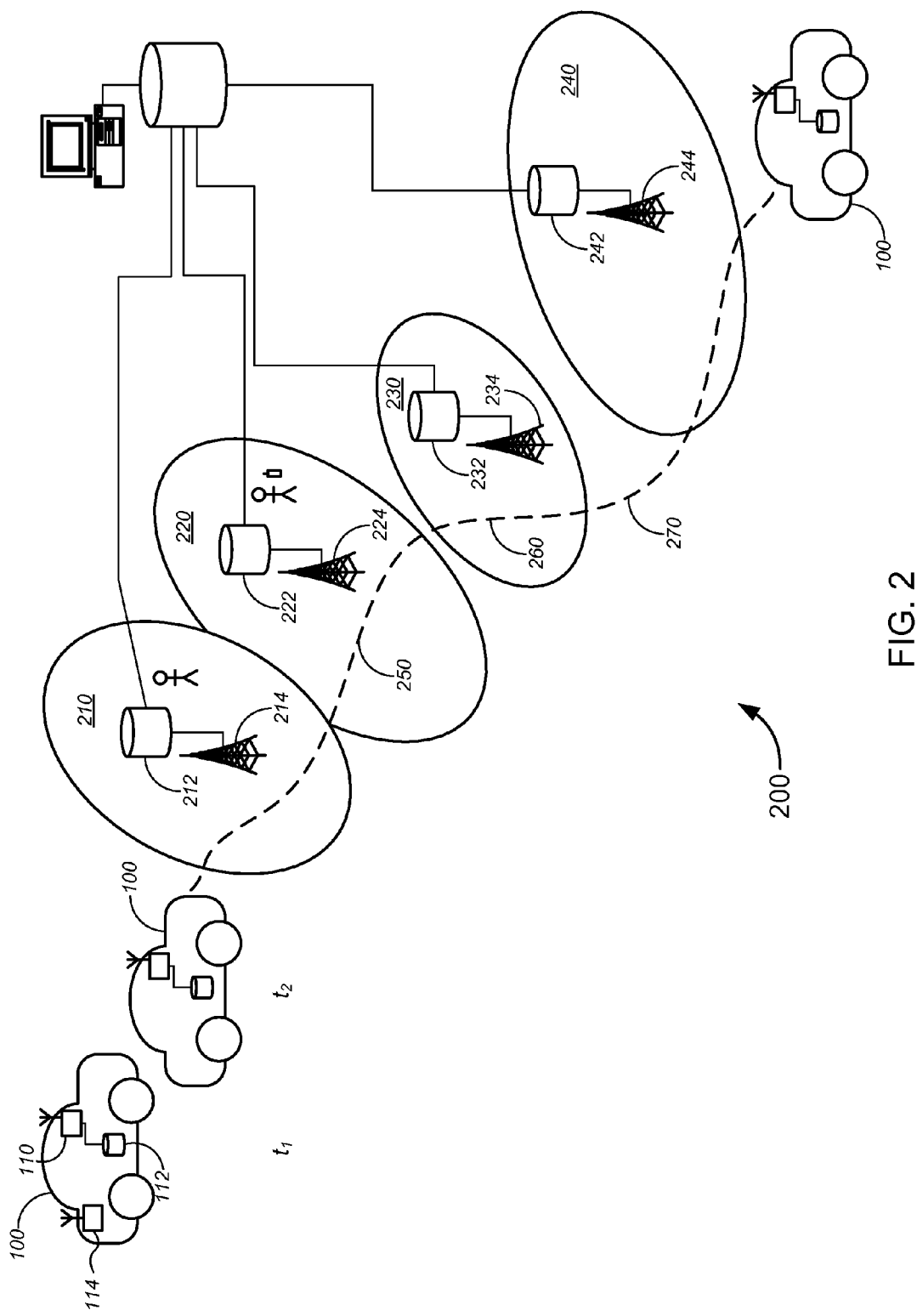
FIG. 2 is a simplified schematic of a mobile user passing through multiple network regions according to methods of the present invention.
Figure 3:
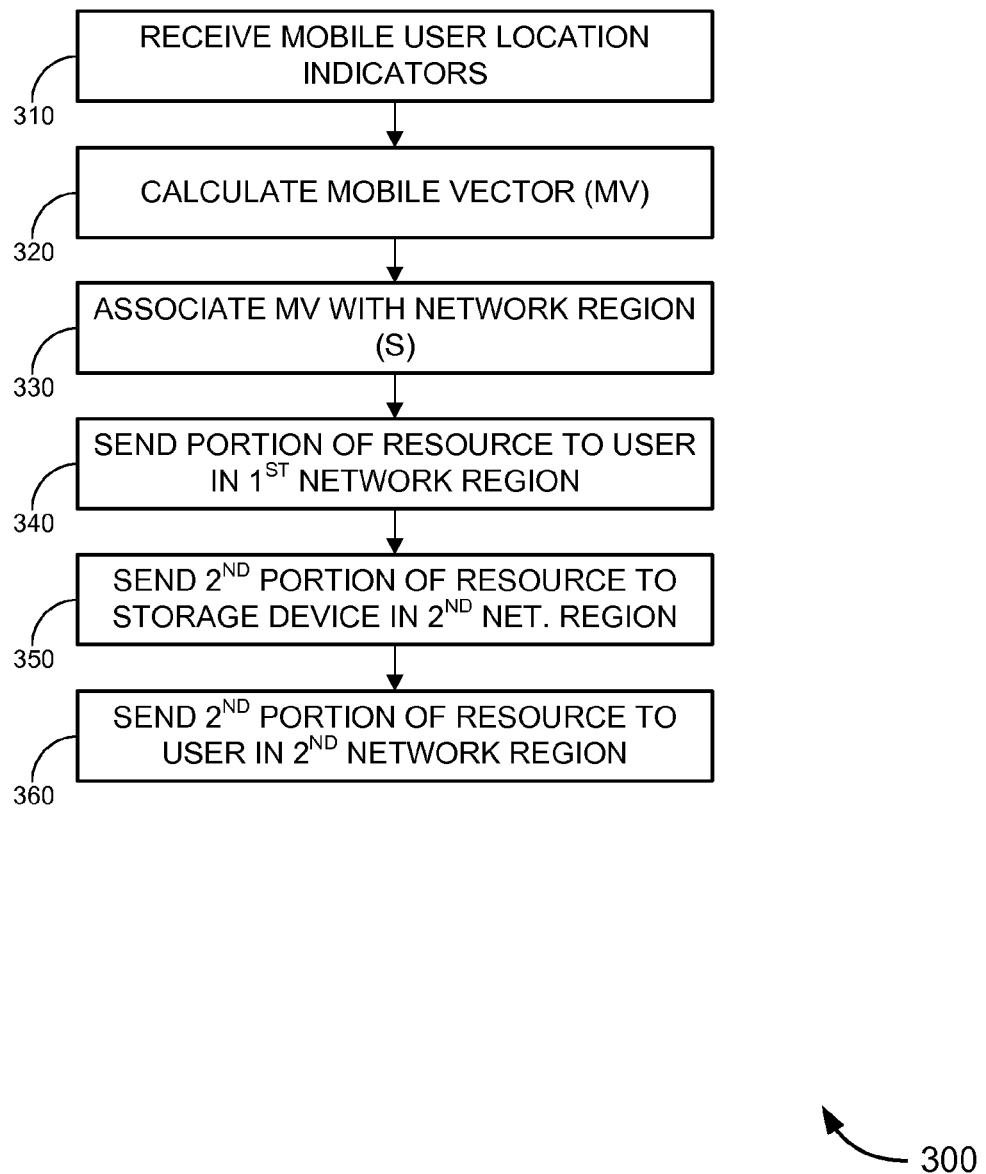
FIG. 3 is a simplified flowchart of a method of delivering a requested resource according to an embodiment of the present invention.

Turning now to FIGS. 2 and 3, an exemplary embodiment of the present invention will be described. In this embodiment, mobile user 100 has a mobile device that includes Wi-Fi connection 110, cache 112, and location determination device 114. Mobile user 100 desires a resource stored on remote server or cache 150. In this embodiment, mobile user 100 transmits a resource request to remote server 150 via a network such as a wireless network. In one embodiment, the request for the resource occurs at a time T1, corresponding to a first mobile user 100 location. Vector controller 160 monitors the resource request and receives a location indicator for mobile user 100. For example, vector controller 160 may be coupled to a network into which mobile user 100 has transmitted their resource request. In one embodiment, the location indicator includes a latitude and a longitude provided by location determination device 114. As previously noted, in a particular embodiment location determination device 114 is a GPS device, including a GPS receiver. In some embodiments, the location indicator further includes an altitude of mobile user 100 and/or a time stamp. In this manner, vector controller 160 is informed of a particular position of mobile user 100 at a particular point in time (T1). In one embodiment, the location indicator is provided to vector controller 160 by mobile user 100. In another embodiment, the GPS satellite system relays the position of mobile user 100 to vector controller 160.

In one embodiment, mobile user 100 further provides a second location indicator to vector controller 160 at a second time (T2). Again, this location indicator may include a latitude, a longitude, an altitude, and/or a time stamp. By receiving two location indicators having the designated characteristics, the speed and direction of travel of mobile user 100 may be estimated. In a particular embodiment, this estimation or calculation produces a vector associated with mobile user 100. In one embodiment, the mobile user vector is calculated by vector controller 160. In a particular embodiment, vector controller 160 receives a plurality of location indicators to update the mobile user vector. The plurality of location indicators may be a continuous stream or nearly continuous stream of location indicators for mobile user 100. In one embodiment, the location indicators are provided in a prescribed time interval (e.g., every 5 seconds, 10 seconds, or the like). In another embodiment, the location indicators are provided to vector controller 160 in an irregular pattern. In one embodiment, instead of two GPS readings, a single GPS reading is received and used in conjunction with a digital compass to determine the mobile user's location and direction of travel.

Vector controller 160 monitors resource requests and determines the size of the requested resource. In a particular embodiment, the resource request initiated by mobile user 100 includes a data rate at which mobile user 100 can receive data. Vector controller 160 may further receive information, or compute data rates for the transmission of data from remote server 150 to one or more storage devices positioned in network regions or cells in the general vicinity of mobile user 100. Vector controller 160 determines how to transmit the requested resource to mobile user 100 by using the mobile vector of mobile user 100, the size of the resource requested, and the associated data rate(s) available for transmission through various portions of the network.

In a particular embodiment, mobile user 100 resides in or passes through a network having a plurality of cells or regions. The use of the term "cell" is not limited to a cell tower location. In one embodiment, network regions include regions or portions of a network accessible by a particular access point. In one embodiment, such as shown in FIG. 2, the network includes at least four network regions 210, 220, 230, and 240. Each network region has a storage device and a transmission device associated therewith. For example, network region 210 includes a storage device 212 and a transmission device 214. Storage device 212 may comprise a server, a cache, or a wide range of devices capable of storing electronic or optical data. Transmission device 214 may comprise a Wi-Fi connection, a transmission tower, WiMax, 2G/2.5G/3G cellular, and the like. Similarly, network region 220 includes a storage device 222 and a transmission device 224, network region 230 includes a storage device 232 and a transmission device 234, and network region 240 includes a storage device 242 and a transmission device 244. While storage devices 212, 222, 232, and 242 are depicted to be similar in nature, each network region may have different storage devices or more than one storage device associated therewith. Similarly, while the transmission devices 214, 224, 234, and 244 are depicted as similar in nature, they too may vary from region to region, and each region may include more than one transmission device. In one embodiment, the location or position of transmission devices 214, 224, 234, and 244 are known or can be determined. Further, while the network regions 210, 220, 230, and 240 are depicted as having minimal to no overlap, some or all of the regions may overlap one another within the scope of the present invention.

In one embodiment, vector controller 160 uses the location indicators and the times associated therewith to calculate the mobile vector for mobile user 100. The mobile vector may include the speed and direction of travel of mobile user 100 and may be updated periodically or on a continuous or nearly continuous basis. In a particular embodiment, the calculated mobile vector includes a known location of mobile user 100. For example, this may comprise comparing the locations of mobile user 100 at times T1 and T2, and extrapolating a travel path between the two locations. Calculating the known portion of the mobile vector may also include comparing the point positions provided by first and second location indicators received for mobile user 100 and comparing those indicators with a street map or the like. Vector controller 160 has a mapping function or mapping database in one embodiment.

In another embodiment, vector controller 160 calculates a predicted path of mobile user 100. This may be accomplished in a number of ways within the scope of the present invention. For example, in one embodiment vector controller 160 predicts the direction of travel and speed of mobile user 100 to remain constant relative to the prior two or more mobile user positions provided by the location indicators. This approach may be particularly accurate in the event vector controller 160 receives nearly continuous updates of the mobile user 100 position. In another embodiment, vector controller 160 calculates the predicted position of mobile user 100 by comparing the known mobile vector portion for mobile user 100 with a street map. This will be particularly useful in the event mobile user 100 is traveling by car, plane, train, bus, motorcycle, or other vehicle and uses known streets, roadways, rail lines, or airways. In this manner, vector controller 160 can determine on which streets mobile user 100 is traveling, and predict the continued course of mobile user 100. In another embodiment, vector controller 160 has a database associated therewith for storing prior known paths of travel for mobile user 100. For example, mobile user 100 may take the same one or few streets while traveling between home and work. In one embodiment, the database associated with vector controller 160 stores these known paths for a particular mobile user, associating the known paths to mobile user 100 by a designated user identification or other mobile user indicator. In this embodiment, vector controller 160 uses one or more location indicators for mobile user 100 to determine which path mobile user 100 is expected to be traveling. In another embodiment, vector controller 160 may assume mobile user 100 is on the path corresponding to the route typically traveled on a particular day of the week. For example, if the resource request is received from mobile user 100 on a Monday, and mobile user 100 travels to work on the same path on Mondays, vector controller 160 can predict the path of mobile user 100 for at least a period of time.

By predicting and/or calculating the direction and/or speed of mobile user 100, vector controller 160 can control the transmission of the requested resource from database or remote server 150 to mobile user 100. More specifically, in one embodiment, the requested resource is broken into one or more segments or portions to be transmitted to mobile user 100 as mobile user 100 travels along a predicted path. For the embodiment shown in FIG. 2, a first portion of the requested resource is transmitted to storage device 212 within network region 210. This first portion of the requested resource is then transmitted to mobile user 100 using transmission device 214 as mobile user 100 passes through network region 210. In another embodiment, the first portion of the requested resource is transferred directly to mobile user 100, bypassing storage device 212 as mobile user 100 passes through network region 210. Similarly, a second portion of the requested resource may be transmitted to storage device 222 in network region 220. In a particular embodiment, this transmission occurs prior to mobile user 100 entering network region 220. In this manner, a portion of the requested resource is pre-populated into storage device 222 prior to mobile user 100 entering network region 220. Then, as mobile user 100 passes from network region 210 into network region 220, transmission device 224 transmits the second portion of the requested resource from cache 222 to mobile user 100. In a similar fashion, third and fourth portions of the requested resource are pre-populated into network regions 230 and 240, and more specifically into storage devices 232 and 234. Again, as mobile user 100 passes through network regions 230 and 240, the third and fourth portions of the requested resource are transmitted to mobile user 100 using transmission devices 234, 244. The transmitted portions of the requested resource are received by mobile user 100 via Wi-Fi connection 110, and stored in mobile user cache 112.

As shown in the example in FIG. 2, there may be portions of the predicted path of mobile user 100 that fall outside designated network regions. At these times, mobile user 100 may not be receiving portions of the requested resource. In one embodiment, mobile user 100 sends acknowledgments back into the network, confirming receipt of various portions of the requested resource. In a particular embodiment, the acknowledgments transmitted are standard or modified TCP/IP acknowledgments, and confirm receipt of various portions of the requested resource.

In one embodiment, the portions of mobile user's travel between network regions may be used for the confirmation of the receipt by mobile user 100 of portions of the requested resource. In this manner, vector controller 160 may direct portions of the requested resource to be re-transmitted by subsequent network regions in the event mobile user 100 failed to receive, or did not receive all of the portions of the requested resource sent to mobile user 100 while the user passes through earlier network regions. In another embodiment, portions of the requested resource are not sent to all anticipated network regions through which mobile user 100 will pass. In this manner, vector controller 160 may control the distribution of the requested resource to accommodate network congestion or other factors that may slow the transmission of the requested resource to mobile user 100. For example, the first portion of the requested resource may be sent to network region 220 and the second portion of the requested resource may be sent to network region 240 for subsequent receipt by mobile user 100.

A particular embodiment of the present invention is depicted in FIG. 3. The embodiment shown in FIG. 3 describes a method 300 for transmitting a requested resource to a mobile user. In this embodiment, this method includes receiving mobile user location indicators (Block 310), and calculating a mobile vector of mobile user 100 (Block 320). The mobile vector is associated with one or more network regions (Block 330). A first portion of the resource is sent to the user while mobile user 100 is in the first network region (Block 340), and a second portion of the resource is sent to a storage device in the second network region (Block 350). The second portion of the resource is sent to mobile user 100 when the user is in the second network region (Block 360). In this manner, the requested resource is broken into a desired number of components and transmitted to mobile user 100 as the user passes through multiple network regions. It will be appreciated by those skilled in the art that the procedures identified in method 300 may not necessarily be performed in the order indicated. Further, in some embodiments, other procedures or steps are inserted between the procedures indicated in FIG. 3, or certain procedures may be eliminated from the depicted method. For example, in one embodiment a user authentication step occurs to confirm a user identity before transmitting a requested resource. In another embodiment, the transmissions are encrypted before being sent.

Figure 4B:
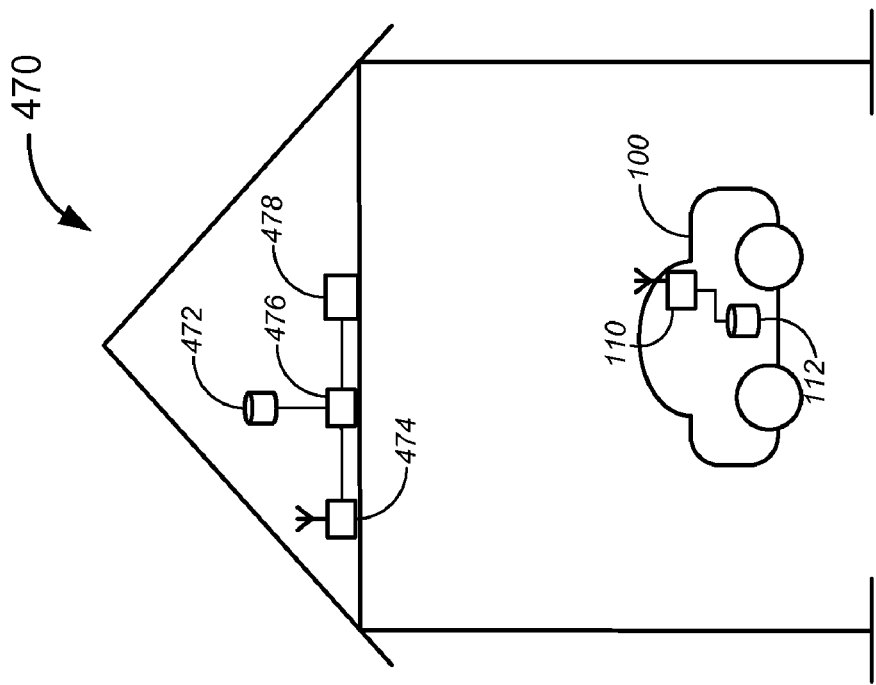
FIGS. 4A-4B schematically depict alternative embodiments of the present invention.
Figure 4A:
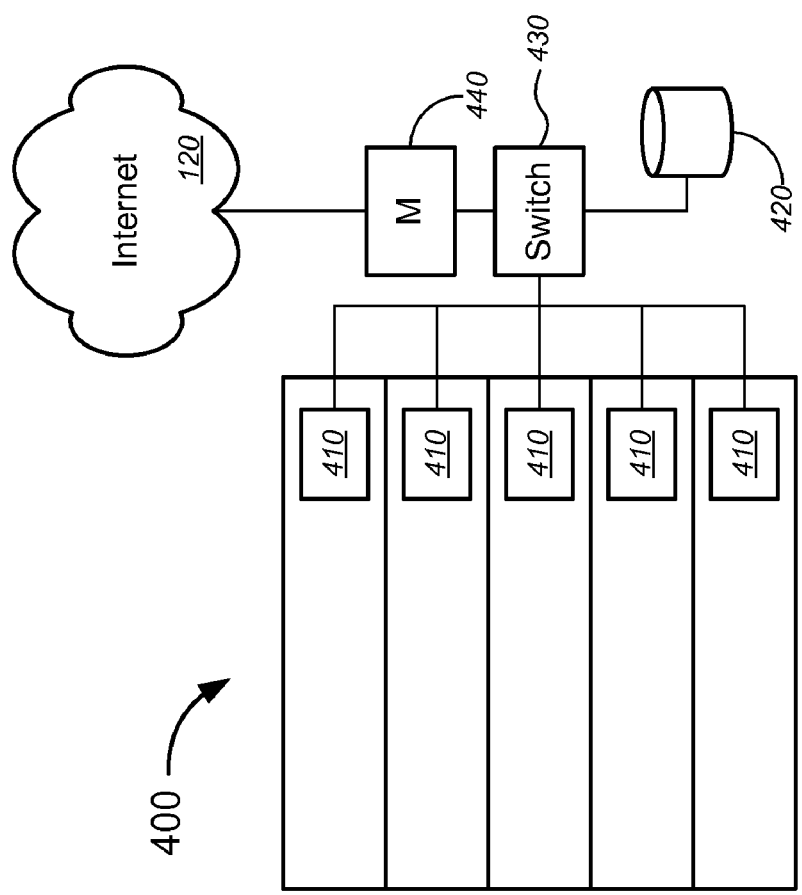

Turning now to FIGS. 4A-4B, alternative embodiments of the present invention will be described. In the embodiment shown in FIG. 4A, a mobile user may be positioned at a stationary location such as in a parking structure 400. In this embodiment, a plurality of Wi-Fi connections 410 are positioned within structure 400. Wi-Fi connections 410 may be fixed Wi-Fi access points, Wi-Fi connection points associated with other vehicles or mobile users, or the like. In this embodiment, at least one of the Wi-Fi access points 410 is associated with mobile user 100. Mobile user 100 requests a particular resource, such as by sending a request through the Internet 120. The Internet 120 may be coupled to the Wi-Fi access points 410 by way of a modem 440, and a switch 430. In one embodiment, resources requested by the mobile users in parking structure 400 may be stored in a cache 420 or other data storage device associated with parking structure 400, or in close proximity thereto. The requested resource is then transmitted to the mobile user in parking structure 400.

In a particular embodiment, a mobile user disposed within parking structure 400 requests a resource that is already contained in cache 420. For example, the mobile user may request a resource previously requested by another mobile user within parking structure 400 and stored in cache 420. In one embodiment, the mobile user may be requesting the download of a recently-released movie in lieu of going to a video rental store such as Blockbuster®. The requested resource or movie is downloaded to the mobile user while the mobile user's vehicle is parked within structure 400. In some embodiments, the resources stored on cache 420 have time stamps or other features that limit the number of times they can be copied, the number of times they can be viewed, and the like. For example, if a single user downloads a particular movie while in parking structure 400, and the movie is saved on cache 420, the movie resource may be deleted from cache 420 after a designated period, such as one hour, one day, or the like. In this manner, the server or service that provides access to the requested resource (e.g., movie) maintains some control over the movie's distribution. Other Digital Rights Management (DRM) techniques also may be used within the scope of the present invention to control use of the requested resource by mobile users.

In a particular embodiment, mobile user 100 downloads requested resources for subsequent viewing at work or home. In the embodiment shown in FIG. 4B, the mobile user 100 has arrived at home and parks in or near the user's residence or in mobile user 100's garage. Wi-Fi connection 110 uploads the resource from cache 112 to a stationary Wi-Fi connection 474 associated with mobile user's garage, residence, workplace, or the like. Using a modem 476 or other appropriate interface, the requested resource is stored in a home cache 472. Home cache 472 may be a computer, a server, a digital storage device, or the like. The requested resource then may be displayed on any appropriate appliance 478 such as a television, computer, or the like. Requested resources received during travel by mobile user 100 may be viewed when the mobile user arrives at the intended destination. In this manner, mobile user 100 is not distracted by real time viewing of the requested resource.

In another embodiment, real time viewing of or listening to the resource is desired, such as when the requested resource is a weather report, traffic report, or the like. Further, in another embodiment, mobile user 100 is traveling interstate or intrastate and desires to have a movie, for example, viewed by occupants of the mobile user's vehicle. Mobile user 100 downloads the movie and displays it on appropriate appliances within mobile user's vehicle. For example, DVD screens and other viewing apparatus are available from many vehicle manufacturers or as after market products so vehicle occupants can watch movies, play video games, or the like. In this particular embodiment, a desired movie is downloaded for viewing during travel in mobile user's vehicle.

While the present invention is described in conjunction with particular embodiments, those skilled in the art will appreciate that other embodiments also exist within the scope of the present invention. For example, stationary caches 212, 222, 232, and 242 described in conjunction with FIG. 2 may reside at any number of locations. For example, the caches may reside at fixed locations such as restaurants (e.g., McDonalds®, Starbucks®, or the like), banks, service stations, and any number of institutions that have widespread distribution throughout metropolitan areas. For mobile or stationary caches that exist in metropolitan areas, it may be desirable to pre-populate the cache with popular or desirable items. For example, caches 410 shown in FIG. 4A may be loaded with weather reports, traffic reports, or the like. As mobile users get in their vehicles to drive home, they can readily download the desired resources. In another example, caches 212, 222, 232 and/or 242 may be populated with popular or commonly requested resources. Again, these resources may be most anything, including weather reports, traffic updates, news headlines, sports scores, advertisements, and the like. In this manner, when mobile user 100 requests such a resource, the resource may be readily sent to user 100 by transmission devices 214, 224, 234, 244, or the like.

In one embodiment, the mobile vector is updated on a regular basis. In this manner, changes in a mobile user's direction, speed, and the like can be factored into the mobile vector calculation. Similarly, the association of the mobile vector with desired network regions, and the calculation of portions of the data requested can be updated. For example, if a mobile user is stuck in traffic, additional portions or segments of the requested resource may be downloaded to the mobile user by way of the same cache, instead of pre-populating caches in other network regions that would be otherwise needed if the mobile user were traveling at a normal rate of speed. Further, monitoring the mobile user position and updating the mobile vector and its association with the network regions can further accommodate alternative routes taken by the user, intermediate stops of the user (such as stoplights or to run errands), as well as the changing speeds of the mobile user. Additionally, the above-noted changes or variations to a mobile user's direction and speed may be useful for calculating which parts of the requested resource have been received by the mobile user. For example, if the initial vector calculation determines that the requested resource needs to be split across three network regions, but this calculation occurs when the mobile user is traveling at a slow rate of speed, the calculation may need to be updated in the event traffic breaks free or the mobile user is able to increase the rate of speed such that mobile user will pass through the three network regions more quickly and not receive the full requested resource.

Figure 5A:
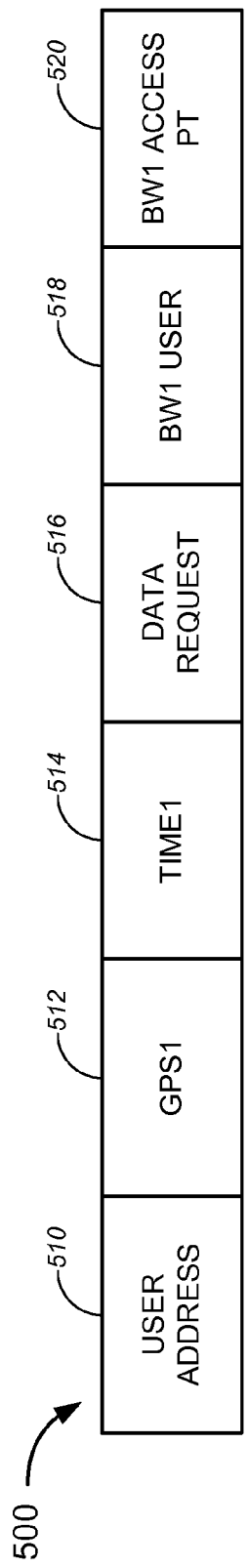
FIGS. 5A-5C depict the data structure used in various transmissions according to an embodiment of the present invention.
Figure 5B:
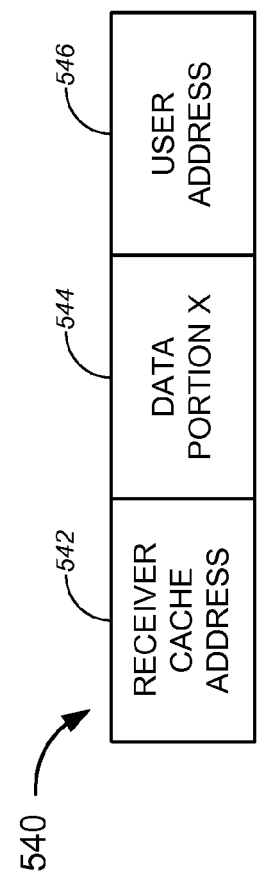
Figure 5C:
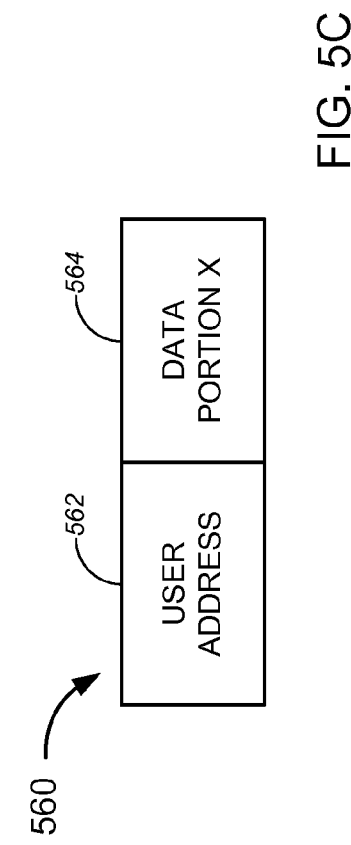

Turning now to FIGS. 5A-5C the data structure for various communications according to embodiments of the present invention will be described. For example, FIG. 5A depicts a data structure 500 applicable to a resource request issued by mobile user 100. As shown in FIG. 5A, the resource request will include a user address 510, a global positioning system (GPS) address 512 and a time stamp (Time 1) 514. The GPS and time stamps will correspond to the user's location at a particular point in time. The user address 510 will correspond to the user's logical address, such as an IP address, MAC address, or the like. Data structure 500 includes the data request 516. This data request may include, for example, the name of a file, a movie, or the like being requested by mobile user 100. Further, in one embodiment, data structure 500 includes the bandwidth of the user to the network access point 518 and the bandwidth of the access point to the user 520. These bandwidths may comprise the speed at which the user can transmit and receive data from the mobile user's Wi-Fi connection 110 to the network access point. Again, the access point may comprise a wide range of access points, including transmission terminals 130 and 140 (FIG. 1), connection devices 214, 224, 234, 244 (FIG. 2) or access points 410 (FIG. 4A).

FIG. 5B depicts a data structure for transmission of at least a portion of the requested resource from the main cache or remote server to the mobile or stationary cache identified to deliver the requested resource portion to the mobile user. Data structure 540 may include the receiver cache address 542, that is the address for the mobile or stationary cache. Data structure 540 includes at least a portion of the requested resource 544 as well as the user address 546. With reference to FIG. 1, the receiver cache address may comprise, for example, the address for cache 134 or 144, depending upon which access point 130 or 140 will be used to transmit data to mobile user 100. Similarly, user address 546 will comprise the address for mobile user 100.

FIG. 5C depicts a data structure 564 for the transmission of at least a portion of the requested resource to mobile user 100. For example, data structure 560 is shown as including a portion of the requested resource 564 and the user address 562. The user address 562 again is similar to or identical to user addresses 510 and 546 depicted in FIGS. 5A and 5B, respectively. In this manner, portions of the requested resource are transmitted to mobile user 100, and are received by mobile user 100 as designated by user address 562.

FIG. 6 depicts one embodiment of a vector controller 600 according to the present invention. Vector controller 600 may be identical or similar to vector controllers 160, 164 described in conjunction with earlier figures. Vector controller 600 tracks the movement of mobile users to coordinate the transmission of requested resources to the mobile users. To do so, vector controller 600 receives user data 650 related to the mobile user. In one embodiment, user data 650 may be similar to data 500 depicted in FIG. 5A. For example, user data 650 may include location indicators that comprise, in one embodiment, user address 510, global positioning system (GPS) address 512, and time stamp 514. User data 650 may be transmitted periodically, continuously, near continuously, or intermittently to vector controller 600 in alternative embodiments.

Vector controller 600 calculates or tracks the movement of mobile users and data through a network, and facilitates the fulfillment of resource requests by acting as a centralized or decentralized locator application. In one embodiment, vector controller 600 resolves user requests for resources or content by matching the user with the closest or least cost fulfillment options. The cost may be determined by network costs, network metrics (e.g., the number of transmission segments between the user and the resource storage location), and/or content transfer pricing. Vector controller 600 determines the mobile user's movement through the network portions or cells, and facilitates the pre-positioning of content at various transmission locations so it is available when the user arrives. The time stamps on the updated GPS locations for the mobile user and the time between location updates, helps vector controller 600 to determine how fast the user is moving between caches, network regions, and/or wireless access points. System data transfer speed, that may include the ability of the mobile user to receive data as well as the transmission rates between various points within the network, helps allow vector controller 600 to determine the size of data packages to send to the mobile user. In one embodiment, each data segment or package may comprise any number of TCP/IP packets. Other packet formats also may be used within the scope of the present invention.

FIG. 6 depicts one embodiment of vector controller 600 according to the present invention. It will be appreciated by those skilled in the art that alternative embodiments of vector controller 600 also fall within the scope of the present invention. In the depicted embodiment, vector controller 600 includes a user and cache location mapper 610. Location mapper 610 stores GPS coordinates of stationary and mobile caches. For example, location mapper 610 may contain a list or table of transmission devices 214, 224, 234, 244 and their corresponding location. The location for the transmission devices may include a latitude, a longitude, and/or an altitude. Location mapper 610 further receives location indicators related to the mobile user to help track the mobile user's movement through the network. The location indicators include latitude, longitude, altitude, and/or a time stamp in some embodiments. Further, in one embodiment, location mapper 610 tracks the movement of multiple mobile users through the network.

Vector controller 600 further includes a user data server 620 coupled to a database 625. In one embodiment, user data server 620 and database 625 store information related to users who have access to the system. This information may include user names, passwords, access charges, user profiles, preferences, and the like. In one embodiment, database 625 further includes data related to the mobile user's predicted or past travel paths. For example, as previously noted, if a mobile user typically drives one or two routes between work and home, this information may be stored and updated periodically within database 625. In one embodiment, database 625 will link to a content tracking database 635 that is coupled to a content packaging engine 630. Content tracking database 635 helps track which caches or servers within a network have content, and act on user requests for the content. Database 635 may further store the content or resources retrieved on behalf of the mobile users. In one embodiment, database 635 contains a list, record, or table of resources sent to user X, which user X may subsequently make available to other mobile users as described further below in conjunction with FIG. 7. Content packaging engine 630 takes the mobile user resource requests and communicates with location mapper 610 to determine where the mobile user is, and communicates with content tracking database 635 to determine where the user-requested resource is stored. Content packaging engine 630 then communicates with user data server 620 to determine the mobile user's system data transfer speeds based, in one embodiment, on GPS location and time stamps. In one embodiment, this data is received between user requests to the wireless access points. With this information, content packaging engine 630 packages the content or resource into appropriate size packages or segments which the mobile user can efficiently receive. In addition, content packaging engine 630 transfers the resource packages or segments to caches within the network based on the predicted path of the mobile user by way of location mapper 610. Again, this may be at least partly based on stored or derived user paths received from user data server 620 and database 625.

Vector controller 600 may further include one or more user interfaces 640. In one embodiment, interface 640 is used for configuration control. Vector controller 600 configuration may be performed through, for example, a web-based graphical user interface (GUI) by way of a web browser or similar interface. In addition, a CLI interface may be included. In a particular embodiment, web servers are supported on all components 610-640 to support configuration changes to the various components of vector controller 600. Communication between the servers associated with vector controller 600 may be accomplished via eXtensible Markup Language (XML), or similar data passing languages. Interfaces 640, in one embodiment, support user-to-user and computer-to computer interfaces to automate the recommendation of content as well as to support content conversion functions. Database engines 620, 630 may include MySQL server, Oracle database servers, or the like. In this manner, vector controller 600 helps coordinate the transmission of requested data from various data storage locations throughout the network to a user by sending the data segments directly to the user or by pre-populating various cache locations so that the mobile user can receive portions of the requested resource as the mobile user enters network regions serviced by the various cache locations.

Figure 7A:
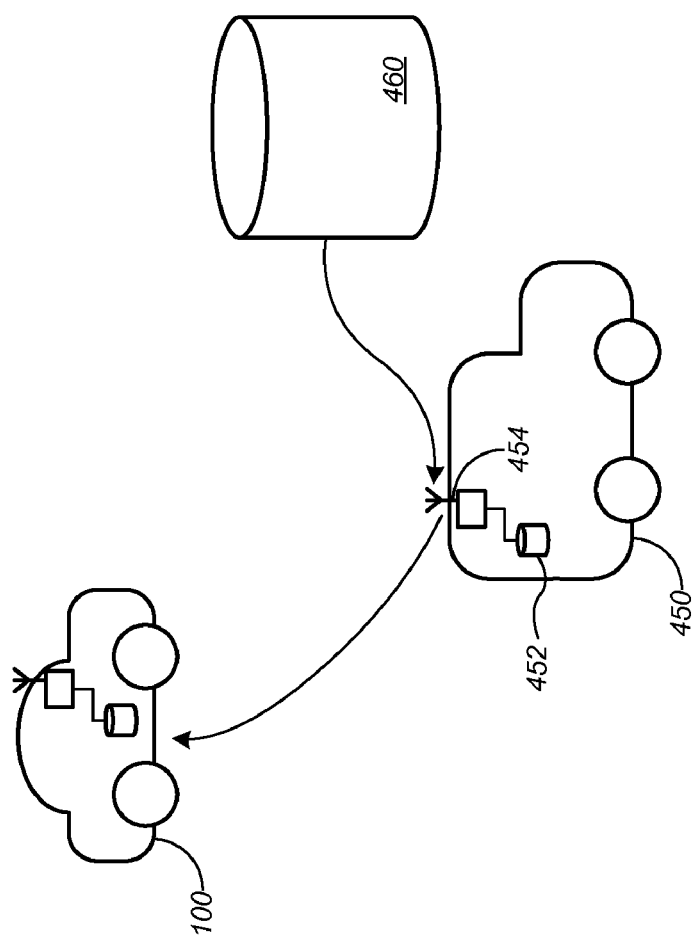
FIG. 7A schematically depicts an alternative embodiment of the present invention.

In another embodiment as shown in FIG. 7A, mobile user 100 may request a resource that has been previously requested by a second mobile user 450. For example, mobile user 450 may have requested the downloading of a web page, a traffic report, a weather report, or the like, that is subsequently requested by mobile user 100. In this embodiment, the remote server or cache 460 containing the requested resource and/or the vector controller is aware of mobile user 450's prior request for the same resource. Instead of having a vector calculator determine the plurality of network regions across which the resource needs to be forwarded to mobile user 100, the remote server 460 or vector calculator requests that second mobile user 450 transfer the resource to mobile user 100. In one embodiment, mobile user 450 receives a sub-resource request that is transmitted to a Wi-Fi connection 454 associated with second mobile user 450. The sub-resource request provides appropriate information to second mobile user 450 so that the resource requested by mobile user 100 may be transmitted from second mobile user 450 to mobile user 100. In some embodiments, cache 452 associated with second mobile user 450 stores particular resources in a manner indicating second mobile user 450 is willing to share the resource with other mobile users. Portions of cache 452 also may be reserved for the private use of second mobile user 450. In this embodiment, cache 452 may have a shareable portion, for storage of resources that mobile user 450 is willing to share with other mobile users, and a non-shareable portion having protected resources of mobile user 450. In one embodiment, second mobile user 450 pays a discounted price for content downloading services if second mobile user 450 is willing to share certain resources once those resources have been downloaded. By transferring at least portions of requested resources between two mobile users, the network is free to accommodate other users without having to use network resources to accommodate mobile user 100's request. Further, the user-to-user transfers can occur at a higher rate of speed compared to transmissions from the network access points (e.g., devices 214, 224, 234, and 244). In one embodiment, user-to-user transfers occur at speeds at or greater than 10 megabits per second (Mbps). In another embodiment, user-to-user transfers occur transparently to one or both users. For example, mobile user 100 receives the requested resource, but is unaware the resource was provided by mobile user 450.

In another embodiment, the mobile user cache 452 described in conjunction with FIG. 7A is maintained in taxis, city buses, trains, airplanes, or the like. In this manner, these mobile vehicles operate as mobile caches to facilitate the downloading of requested resources by mobile users. Again, in one embodiment, the mobile users having some or all of their caches available for the receipt of requested resources and transmission thereof to other mobile users may receive a credit, payment, or the like for accommodating the public cache. Further, the distribution of frequently requested resources (e.g., weather and traffic reports), can be maintained on mobile caches in city buses, taxis, and the like. As a result, a mobile user in need of this resource can send the resource request into the network, and rapidly receive the resource from the bus or taxi next to them. In one embodiment, mobile user cache 452 is associated with a location determination device (such as a GPS device). In this manner, the data management system and/or vector controller can be aware of the location of mobile user cache 452.

In one embodiment, systems and methods of the present invention provide for the management of resources or content. In the embodiment shown in FIG. 7B, a mobile user 710 has a cache 712 coupled to a connection device 714. Mobile user 710 also may have a location determination device and/ or GPS device as previously described. Mobile user 710 creates and provides a content report as represented by an arrow 716. In one embodiment, content report 716 is reported to a vector controller 750. Vector controller 750 may be similar to or identical to vector controllers 160, 164, 600. Vector controller 750 is able to communicate with mobile user 710 by way of a transmission device 740 and other components including switches, routers, modems, networks, and the like (not shown). Vector controller 750 is coupled to a database 755 for storing some or all of content report 716. In a preferred embodiment, database 755 contains content reports from a plurality of mobile users.

Figure 7B:
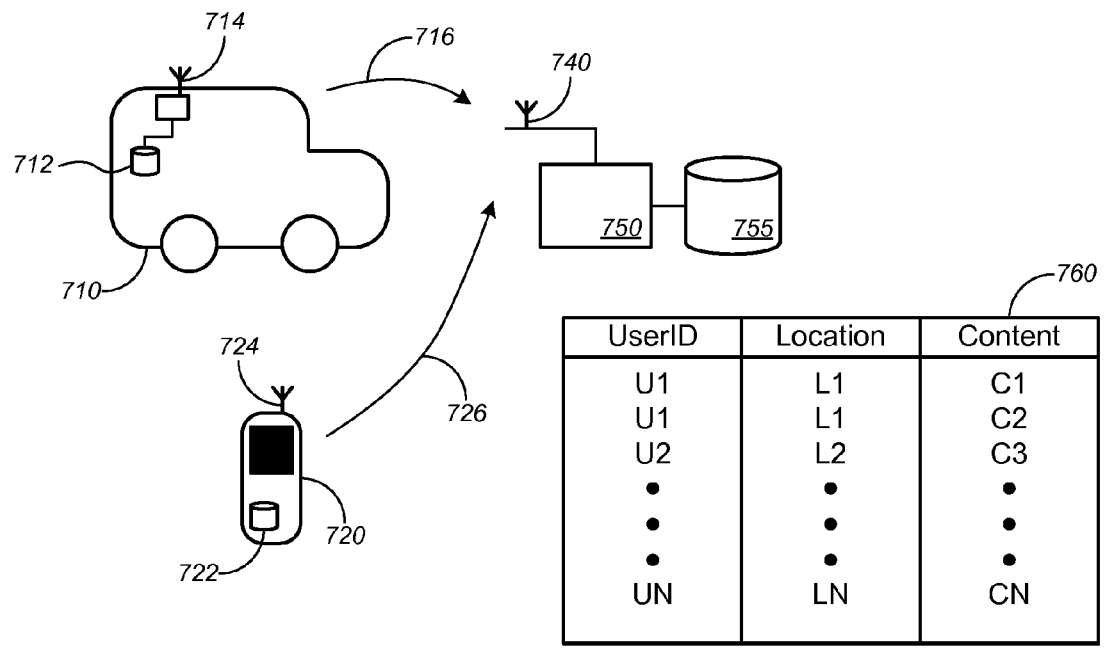
FIGS. 7B-7C are simplified schematics of a content management scheme for use with embodiments of the present invention.

A second mobile user 720 is depicted in FIG. 7B as a PDA or other hand-held device. Second mobile user 720 includes a cache 722 and a connection device 724, and also may contain a location determination device. Connection devices 714, 724 may, in one embodiment, comprise WiFi connections. In this embodiment, second mobile user 720 also provides a content report 726 to vector controller 750. Vector controller 750 then manages the collected content reports in database 755. In one embodiment, the content reports are managed in a table 760 as schematically depicted in FIG. 7B. Table 760 may include a user identifier (U1-UN), a user location when the content report was provided (L1-LN), and an identifier of the content available with the respective users (C1-CN). In one embodiment, content reports 716, 726 provide a content identifier that identifies the content stored in mobile caches 712, 722, which mobile users 710, 720 are willing to make available to other mobile users. In another embodiment, the content is transmitted with the content report and stored in database 755. As shown in table 760, each mobile user may have more than one piece of content that they either provide to database 755 or indicate they are willing to share with other mobile users. In some embodiments, content reports 716 and 726 are updated intermittently, periodically, or continuously so that database 755 maintains an accurate record of available content.

In the embodiment of FIG. 7B, mobile users requesting content C1, for example, may be provided with content C1 after vector controller 750 notifies user U1 that another mobile user has requested content C1. In this example, mobile user U1 is within transmission range of the requesting mobile user and the transmission of content C1 may occur from mobile user U1 to the requesting mobile user as schematically depicted in FIG. 7A. In another embodiment, the content is received from mobile user U1's transmission device 740, and rerouted to the requesting mobile user using vector controller 750 as previously described in conjunction with earlier embodiments. In this manner, the source of the requested content C1 may not be a stationary server or other storage mechanism, but may be a mobile user U1.

Figure 7C:
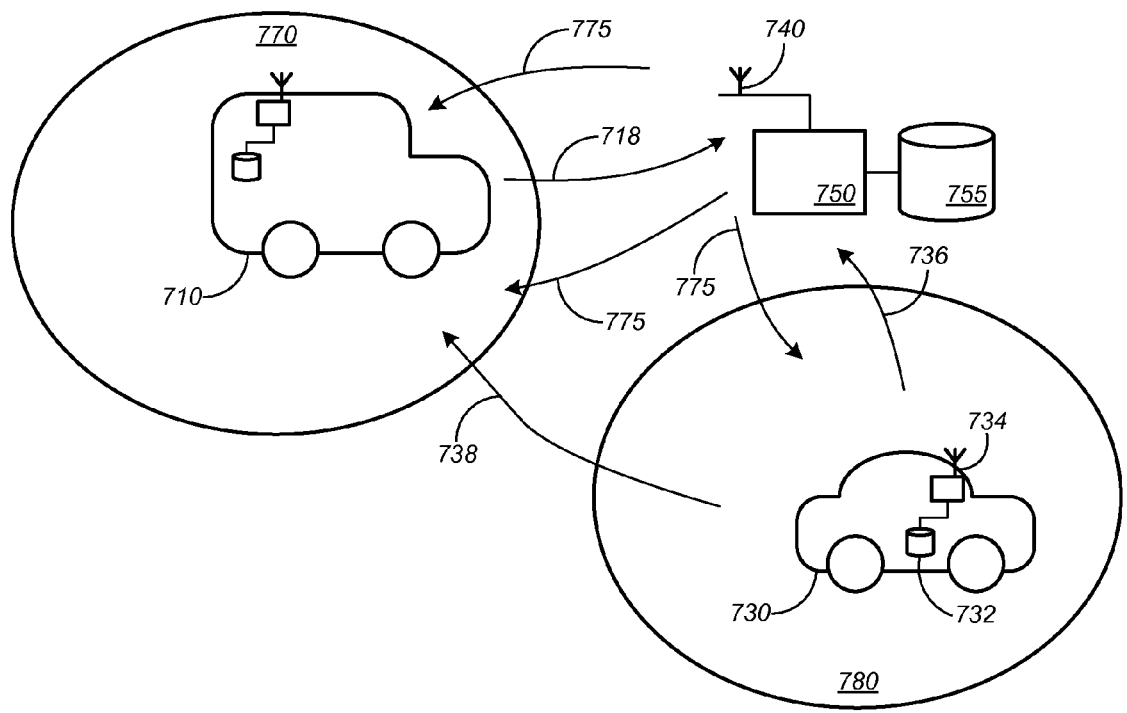

In an alternative embodiment depicted in FIG. 7C, user 710 issues a resource request 718 that is received by transmission device 740 and forwarded to vector controller 750 in a manner similar or identical to that described in conjunction with earlier figures. In this embodiment, vector controller 750 initiates a content request 775 that seeks mobile users in the vicinity of user 710 that may have the content or data requested in resource request 718. In one embodiment, transmission device 740 initiates content request 775 in a first network region or cell 770. This may be the same network region from which mobile user 710 initiated resource request 718. Such a content request will be particularly useful, for example, when mobile user 710 is at a fixed or stationary location such as in the parking structure described in conjunction with FIG. 4A. In another embodiment, vector controller 750 calculates the predicted path of mobile user 710 and sends content request 775 into one or more network cells or regions 780 which mobile user 710 is expected to enter in the future. In one embodiment, the requested content is possessed by a mobile user 730 in region 780. Mobile user 730 includes a cache 732 and a transmission or connection device 734. In this manner, the resource may be transmitted from user 730 to mobile user 710 when user 710 enters network region 780. Alternatively, mobile user 730 sends the requested resource to mobile user 710 while the two users are in different network regions 770, 780, provided the transmission capability of transmission device 734 and the receiving capability of connection device 714 permit it.

In one embodiment, as indicated by arrow 736, mobile user 730 transmits either the requested content back to vector controller 750 or provides a response to vector controller 750 indicating that mobile user 730 has the resource requested by mobile user 710. Transmission of the requested resource from mobile user 730 to mobile user 710 may then occur by vector controller 750 controlling the routing of the resource through an intermediate network, to transmission device 740 and on to mobile user 710.

In one embodiment, vector controller 750 updates database 755 with a record of content provided by mobile user 730. In this manner, mobile user 730 may receive a credit or some other benefit as a result of user 730's willingness to provide requested content to mobile user 710. The benefits may include a wide range of items or services desirable to mobile users including, without limitation, free downloads of desired content, or the like. It will be appreciated by those skilled in the art that the user-to-user transmission embodiments described in conjunction with FIGS. 7A-7C are illustrated examples, and the systems and methods of the present invention are not limited thereby.

Notwithstanding the above description, it should be recognized that many other systems, functions, methods, and combinations thereof are possible in accordance with the present invention. Thus, although the invention is described with reference to specific embodiments and figures thereof, the embodiments and figures are merely illustrative, and not limiting of the invention. Rather, the scope of the invention is to be determined solely by the appended claims.

What is claimed is:

1. A method of responding to a resource request of a mobile user, the method comprising:
   receiving first and second location indicators for the mobile user, each of the first and second location indicators having a time associated therewith;
   calculating a mobile vector of the mobile user, and associating the mobile vector with a first network region;
   identifying a second mobile user in the first network region having at least a portion of the requested resource; and
   sending a sub-resource request to the second mobile user, the sub-resource request causing the second mobile user to send at least a portion of the requested resource to the first mobile user.

2. The method as in claim 1, wherein the mobile user and the second mobile user are stationary when the second mobile user sends the portion of the requested resource to the first mobile user.

3. The method as in claim 1, wherein the second mobile user is not stationary when the second mobile user sends the portion of the requested resource to the first mobile user.

4. The method as in claim 1, wherein the sub-resource request causes the second mobile user to send the entire requested resource to the first mobile user.

5. The method as in claim 1, wherein the sending of the portion of the requested resource from the second mobile user to the first mobile user occurs transparently to the first mobile user.

6. The method as in claim 1, further comprising:
   identifying a third mobile user in a second network region having at least a second portion of the requested resource; and
   sending a sub-resource request to the third mobile user, the sub-resource request causing the third mobile user to send at least the second portion of the requested resource to the first mobile user.

7. The method as in claim 6, wherein the third mobile user sends the second portion of the requested resource to the first mobile user when the first mobile user is in the second network region.

8. A mobile device that connects to a remote server through a wireless network, the mobile device comprising:
   a processor coupled to a memory and to a Wi-Fi connection; and
   a location determination device;
   the memory comprising:
      code for sending a resource request to the wireless network via the Wi-Fi connection;
      code for providing the network a mobile device location using the location determination device;
      code for receiving a first portion of the requested resource when the mobile device is in a first network region and for receiving a second portion of the requested resource when the mobile device is in a second network region; and
      code for providing the network with a list of available resources stored in the memory.

9. The mobile device as in claim 8, wherein the memory further comprises code for responding to a second resource request, the second resource request comprising a request for at least one of the available resources.

10. The mobile device as in claim 9, wherein the memory further comprises code for sending at least a portion of the at least one available resource to a second mobile device.

11. The mobile device as in claim 9, wherein the memory further comprises code for sending a content report to the wireless network.

12. The mobile device as in claim 11, wherein the content report comprises a mobile user identifier, a mobile user location, and the list of available resources.

13. A computer system for facilitating data transfer between mobile users, the system comprising:
- a processor coupled to a database;
- a computer readable medium coupled to the processor, the computer readable medium comprising:
  - code for receiving first and second location indicators for the mobile user, each of the first and second location indicators having a time associated therewith;
  - code for calculating a mobile vector of the mobile user, and associating the mobile vector with a first network region;
  - code for identifying a second mobile user in the first network region having at least a portion of the requested resource; and
  - code for sending a sub-resource request to the second mobile user, the sub-resource request causing the second mobile user to send at least a portion of the requested resource to the first mobile user.

14. The computer system as in claim 13 further comprising code for sending a content request to a plurality of mobile users including the second mobile user.

15. The computer system as in claim 13 further comprising code for receiving a content response from the second mobile user, the content response indicating that the second mobile user has the requested resource.

16. The computer system as in claim 15, wherein the database is adapted to store the content response from the second mobile user indicating the second mobile user has the requested resource.

17. The computer system as in claim 13, further comprising code for receiving a content response from a plurality of mobile users and storing the content responses in the database.

18. The computer system as in claim 13, further comprising code for calculating a mobile vector of the second mobile user.

19. The computer system as in claim 18, further comprising code for calculating a transfer scheme for transferring the requested resource from the second mobile user to the first mobile user through at least the first network region.

20. A method of transferring data between mobile users, the method comprising:
- sending a request into a network region requesting resource reports from a plurality of mobile users;
- receiving the plurality of resource reports from at least some of the plurality of mobile users;
- receiving a resource request from a first mobile user of the plurality of mobile users;
- identifying a second mobile user of the plurality of mobile users having the requested resource by referencing the resource reports; and
- sending a transmission request to the second mobile user, the transmission request requesting that the second mobile user send the requested resource to the first mobile user.

21. The method as in claim 20, wherein a vector controller operates to send the request for resource reports into the network.

22. The method as in claim 20, further comprising receiving updated resource reports from at least some of the plurality of mobile users.

23. The method as in claim 20, wherein the resource report comprises a mobile user identifier and a mobile user location.

24. The method as in claim 23, wherein the resource report further comprises a list of available resources.

25. The method as in claim 23, wherein the resource report further comprises at least one shareable resource.

26. The method as in claim 20, wherein identifying the second user further comprises identifying the second user in a same network region as the first mobile user.

27. The method as in claim 20, wherein identifying the second user further comprises identifying a location of the first and second mobile users and comparing a transmission capability of the second mobile user with a receive capability of the first mobile user.

28. The method as in claim 20, further comprising receiving the plurality of resource reports with a vector controller.

29. The method as in claim 28, further comprising storing the plurality of resource reports in a data base in communication with the vector controller.

30. The method as in claim 28, further comprising updating the resource report associated with the second mobile user when the second mobile user sends the requested resource to the first mobile user.

31. The method as in claim 28, further comprising updating the resource report associated with the first mobile user when the second mobile user sends the requested resource to the first mobile user.

32. The method as in claim 20, further comprising sending the transmission request to a third mobile user, the transmission request requesting that the third mobile user send at least a portion of the requested resource to the first mobile user.

33. The method as in claim 32, wherein the second and third mobile users are in two different network regions when the portions of the requested resource are sent to the first mobile user.

* * * * *